US00RE36084E

United States Patent [19]

Gutknecht

[11] E Patent Number: Re. 36,084

[45] Reissued Date of Patent: Feb. 9, 1999

[54] TRACK BRAKE APPARATUS WITH SLIDING SHOES AND WEAR PLATES FOR PREVENTING EXCESSIVE MOVEMENT OF THE SHOES IN THE DIRECTION OF VEHICLE MOVEMENT

[75] Inventor: Leroy H. Gutknecht, Las Vegas, Nev.

[73] Assignee: Thrilltime Entertainment International, Inc., Burnaby, Canada

[21] Appl. No.: 924,900

[22] Filed: Sep. 8, 1997

Related U.S. Patent Documents

Reissue of:

[64] Patent No.: 5,575,218
Issued: Nov. 19, 1996
Appl. No.: 631,163
Filed: Apr. 10, 1996

[51] Int. Cl.[6] ..... B61K 7/00

[52] U.S. Cl. ..... 104/249; 188/62

[58] Field of Search ..... 104/60, 26.2, 249, 104/250, 252; 188/38, 38.5, 40, 43, 62, 63

[56] References Cited

U.S. PATENT DOCUMENTS

| | | | |
|---|---|---|---|
| 2,104,186 | 1/1938 | Clausen | 188/62 |
| 2,904,133 | 9/1959 | Bodkin et al. | 188/62 |
| 3,330,384 | 7/1967 | Bertin et al. | 188/38 |
| 3,827,533 | 8/1974 | Noble | 188/62 |
| 4,030,574 | 6/1977 | Evans | 188/62 |
| 4,819,564 | 4/1989 | Brandis et al. | 104/250 |
| 5,361,705 | 11/1994 | Powell | 104/60 |
| 5,388,525 | 2/1995 | Bodkin | 104/252 |

*Primary Examiner*—S. Joseph Morano
*Attorney, Agent, or Firm*—Jack C. Munro

[57] ABSTRACT

A brake apparatus that is designed to brake a drag race vehicle that is movable within a track of an amusement ride. The braking apparatus includes a pair of braking units that each include movable portions that are movable toward each other so as to clamp onto a guide plate that is being carried by the vehicle as it moves along the track. This clamping onto the guide plate results in slowing and eventual slopping of the vehicle. The braking units are movable by means of inflatable bladders into the braking position. The braking units are mounted on metallic cross beams which are fixedly mounted to the track The movable portions of the braking units are slidably mounted on the metallic cross beams. Longitudinal movement of the movable portions, which occurs during the braking position, is to evenly apply pressure against each of the metallic cross beams. Each of the bring units are continuously spring biased toward the non-braking position.

14 Claims, 4 Drawing Sheets

TRACK BRAKE APPARATUS WITH SLIDING SHOES AND WEAR PLATES FOR PREVENTING EXCESSIVE MOVEMENT OF THE SHOES IN THE DIRECTION OF VEHICLE MOVEMENT

Matter enclosed in heavy brackets [ ] appears in the original patent but forms no part of this reissue specification; matter printed in italics indicates the additions made by reissue.

BACKGROUND OF THE INVENTION

1. Field of the Invention

The field of this invention is directed to a brake apparatus which is designed to be mounted in conjunction with a fixed structure where the brake apparatus, when activated, functions to slow and stop a movable structure that is moving relative to the fixed structure.

2. Description of the Prior Art

Wherever there is a movable structure that is to be moved in conjunction with a fixed structure, there must be employed some type of a braking apparatus to stop the movable structure. An example of such a structure would be within an amusement ride such as a drag race type of amusement ride. In this type of amusement ride, a vehicle within which is to be located a human, is accelerated rapidly a certain distance down a track. The vehicle is tied to the track so that it cannot leave the track. At the end of the acceleration distance, it is then desired to slow and eventually stop the vehicle. In such a ride, it is desirable to not leave the braking to the occupant of the vehicle with instead the braking occurring automatically. The brake apparatus is mounted in conjunction with the track.

In the past, it has been common to utilize track mounted braking units in conjunction with an amusement ride. One such amusement ride has been a roller coaster. However, roller coasters do not only go in a straight line direction but also go around curves. Therefore the problem encountered by roller coaster type brakes is different than brake apparatuses which are designed to be used in conjunction with a straight line type of amusement ride.

SUMMARY OF THE INVENTION

A primary objective of the present invention is to construct a brake apparatus that is intended to be used in conjunction with a straight line amusement ride where a vehicle moves in a straight line from a start position to a finish position.

Another objective or the present invention is to construct a brake apparatus that is to operate in a fail safe manner to slow and eventually stop a movable vehicle within an amusement ride where the vehicle moves in a straight line from a start position to a finish position.

The structure of the present invention is directed to a brake apparatus that is to be mounted in conjunction with a track with the vehicle being movable on that track from a start position to a finish position. The vehicle includes a guide blade that is movable within the track. A series of brake apparatuses are to be mounted in conjunction with this track in a spaced apart relationship from each other. These brake apparatuses are mounted within the deceleration portion of the track. Each brake apparatus is to be basically identical with each brake apparatus including a pair of brake units. Included within each brake unit is a pair of inflatable bladders. Inflating of each bladder by air will result in movable portions of each braker unit being moved toward each other. On the outer face of each movable portion is a brake shoe with the brake shoes of the opposing brake units pressing against the guide blade. This pressure will result in slowing and eventual stopping of the vehicle. Upon release of the air pressure from the bladders a leaf spring assembly will cause the movable portion of each brake unit to move to a non-braking position. Each brake apparatus is mounted on a plurality of metallic cross beams mounted within the track. During braking, the movable portion of the brake apparatus will have a tendency to move longitudinally in the same direction the guide blade is moving. The movable portions of the braking unit apply pressure to a wear plate mounted on each metallic cross beam. The structure that contacts each wear plate of each braking unit is adjustable so as to evenly divide the pressure of this force between the metallic cross beams.

DETAILED DESCRIPTION OF THE PREFERRED EMBODIMENT

Figure 1:
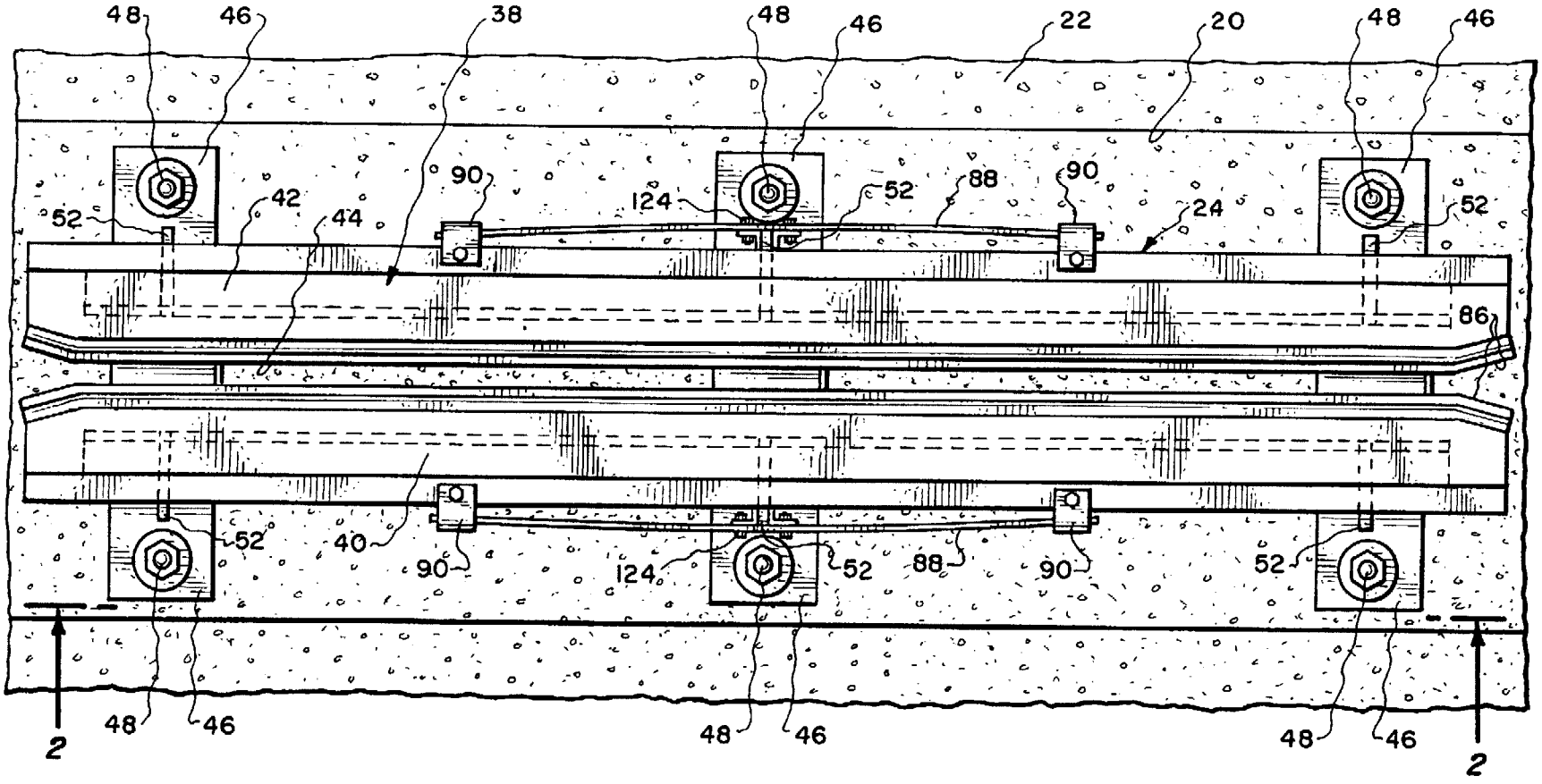
FIG. 1 is a top plan view of a brake apparatus constructed in accordance with this invention showing the brake apparatus in the non-braking position.

There is formed a channel 20 within a cement base 22. This cement base 22 is to be of an extended lineal length. Typical length would be 370 feet. An amusement ride vehicle, with a human occupant, is to be accelerated along the channel 20 for about 175 feet. This leaves about 195 feet to slow the vehicle until it actually comes to a stop. In order to slow the vehicle there is utilized the brake apparatus 24 of this invention.

The vehicle (not shown) is to have mounted on its under-side a guide blade 26. The guide blade 26 is fixedly mounted to the tubular frame 28 of the vehicle. Attachment to the tubular frame 28 of the guide blade 26 is accomplished by means of a mounting bracket assembly 30. Mounted on the guide blade 26 is a retainer bar 32. The retainer bar 32 is fixedly mounted to the guide blade 26 by means of a threaded bolt 36. The threaded bolt 36 passes through a hole formed within the guide blade 26. The retainer bar 32 is located within a retaining channel 34 formed within a track 38. The upper end of the retaining channel 34 is partially closed by a pair of top plates 40 and 42. The function or the retainer bar 32 is to keep the guide blade 26 engaged at all times within the track slot 44. If there is any attempt by the vehicle and the frame 28 to rise in an upward direction away from the cement base 22, the retainer bar 32 will come in contact with the undersurface of the top plates 40 and 42 which will keep the guide blade 26 captured within the track slot 44.

Each brake apparatus 24 will generally be about five feet in length. Each brake apparatus 24 is mounted on a plurality of metallic cross beams 46 with three in number of the metallic cross beams 46 being shown. The metallic cross beams 46 are securely mounted into the cement base 22 by means of threaded bolts 48. The metallic cross beams 46 are intended to be evenly spaced apart. In between the underside of each metallic cross beam 46 and the cement base 22 there may be incorporated a series of washers forming a spacer 50. It is the function of the spacers 50 to locate the metallic cross beams 46 precisely level and slightly off the surface of the cement base 22.

Secured as by welding to each metallic cross beam 46 is a pair of plates 52. Each pair of plates 52 for each metallic cross beam 46 is located in an aligned manner forming a space there between. It is within that space that the guide blade 26 is conducted and is actually to be centrally conducted. Since there are three in number of the metallic cross beams 46, it is to be understood that there will actually be three in number of the plates 52 located on each side of the track slot 44.

Fixedly mounted to the plates 52 and located on one side of the track slot 44 is the channel 54. On the remaining three in number of the plates 52 located on the opposite side of the track slot 44 there is fixedly mounted a similarly shaped channel 56. The outer surface of the channels 54 and 56 each define a flat surface. Abutting against the flat surface of the channels 54 and 56 is an inflatable bladder 58 with it being understood that there is a separate bladder for each channel 54 and 56. One end of the inflatable bladder 58 is completely closed by means of plates 60 and 62 which are tightly bolted together by threaded bolts 64. The opposite end of the inflatable bladder 58 is mounted on a fitting 66. The fitting 66 internally includes a series of through holes 68. The sidewall of the inflatable bladder 58 is tightly clamped onto the fitting 66 by clamp plates 70 and 72. The clamp plates 70 and 72 are secured together by means of threaded bolts 74. The threaded bolts 74 function to tightly mount the wall of the inflatable bladder 58 onto the fitting 66.

Pressurized air is to be supplied from tube 76 and through holes 68 of fitting 66 into the interior chamber 78 of the inflatable bladder 58. This will cause the inflatable bladder 58 to expand. This will also cause U-shaped plate 80 to be moved away from channel 54 or channel 56. The U-shaped plates 80 actually move toward each other. Fixedly mounted to the inside surface of each of the U-shaped plates 80 is a wear plate 82 which is intended to diminish the wear on the wall of the inflatable bladder 58. The wear plate 82 is to abut directly against the inflatable bladder 58. The top plate 40 is fixedly mounted by supports 41 onto one U-shaped plate 80 with top plate 42 being fixedly mounted by supports 43 onto the other U-shaped plate 80. Mounted on the exterior surface of U-shaped plate 80 is a brake shoe 84. Expansion of the inflatable bladders 58 will cause the brake shoes 84 to be moved toward each other within the brake apparatus. This will result in the brake shoes 84 to be pressed on opposite sides of the guide blade 26.

The brake shoes 84 will be located in the braking position for the guide blade 26 prior to entry of the guide blade 26 between the brake shoes 84. The guide blade 26 will be guided into entry between the brake shoes 84 by flared ends 86. Once the guide blade 26 is no longer located between the brake shoes 84, the air pressure that is supplied within the interior chamber 78 is now decreased which will result in the inflatable bladders 58 being capable of being collapsed. The collapsing is caused by leaf spring 88. There is a leaf spring 88 for each U-shaped plate 80. The leaf spring 88 is mounted at its center to the plate 52 that is mounted on the metallic cross beam 46 that is located in the middle of the three in number of the metallic cross beams 46. This mounting is accomplished by threaded bolts 124 and bracket 126. The bracket 126 is welded to plate 52. The ends of the leaf spring 88 are mounted by brackets 90 to U-shaped plate 80.

The brackets 90 are fixedly mounted by threaded bolts 94 and 96 to the U-shaped plate 80. It is to be understood that there is a pair of brackets 90 for each U-shaped plate 80. It is also to be understood that each U-shaped plate 80 is capable of a limited amount of movement on the metallic cross beams 46. It is this movement which is due to the inflation of the inflatable bladders 58 which will result in the brake shoes 84 coming into contact with the guide blade 26. Upon deflation of the inflatable bladders 58, the force of the leaf spring 83 will move the U-shaped plate 80 away from the guide blade 26 and move the brake shoes 84 further apart. The bias of the leaf springs 88 is continuous in the direction away from guide blade 26. The expansion of each of the inflatable bladders 58 must overcome the force of its respective leaf spring 88 when moving of the U-shaped plates 80 outward into the braking position.

With the brake shoes 84 in contact with the guide blade 26, there is a natural tendency for the U-shaped plates 80 and the brackets 90 to be carried along with the guide blade 26, in other words move lineally relative to the cement base 22. In order to prevent this movement, there is mounted a stop block 98 on the U-shaped plate 80. The stop block 98 is mounted directly adjacent the metallic cross beam 46 that is located at the end of the brake apparatus 24 which first engages with the guide blade 26. Looking at the drawings in FIG. 2, the stop block 98 is mounted directly adjacent and on the right side of the metallic cross beam 46 that is at the right side of FIG. 2. Mounted on the metallic cross beam 46 by threaded bolts 100 is a wear plate 102. Each time the braking apparatus 24 applies a braking force against the guide blade 26, the stop block 98 will be moved sharply against the wear plate 102. Eventually over time, this will cause the wear plate 102 to be damaged and will require replacement. The wear plate 102 is used so as to prevent this damage from occurring to the metallic cross beam 46. It is far more desirable to replace the wear plate 102 than replace a metallic cross beam 46.

At the metallic cross beam 46 located at the approximate middle of the longitudinal length of the brake apparatus 24, there is located a stop block 104. The stop block 104 is also fixedly secured to the U-shaped plate 80. It is to be understood that there is a stop block 104 for each U-shaped plate 80. It should also be noted that there is a stop block 98 for each U-shaped plate 80. However, the stop blocks 104 include threaded bolts 106 that protrude from the stop blocks 104. The heads of the threaded bolts 106 are designed to come into contact with a wear plate 108. Wear plate 108 is basically identical to wear plate 102 with wear plate 108 being mounted by threaded bolts 110 to the metallic cross beam 46 that is mounted in the middle of the brake apparatus 24. It is the function of the wear plate 108 to protect the metallic cross beam 46 from being damaged by the braking force. The threaded bolts 106 are to be adjusted in position so that these threaded bolts 106 contact the wear plate 108 at precisely the same time that the stop blocks 98 contact the wear plate 102. This means braking force will be divided so that not all the force is being transmitted to the wear plate 102 but also part of that braking force is being transmitted to the wear plate 108.

Figure 2:
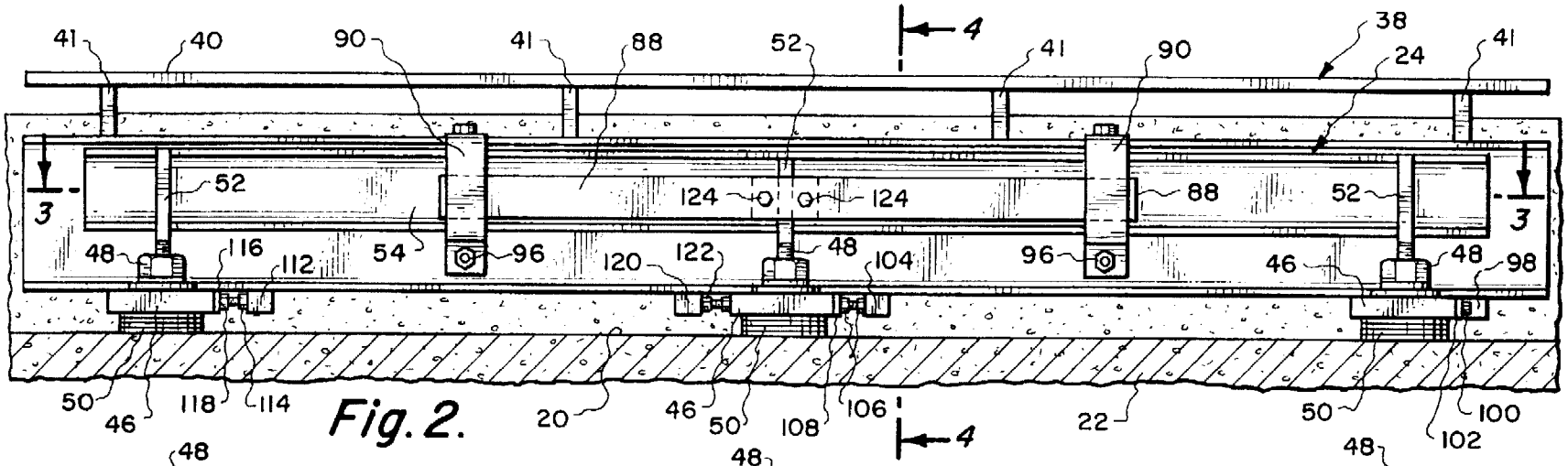
FIG. 2 is a side view of the brake apparatus of the present invention taken along line 2—2 of FIG. 1.
Figure 3:
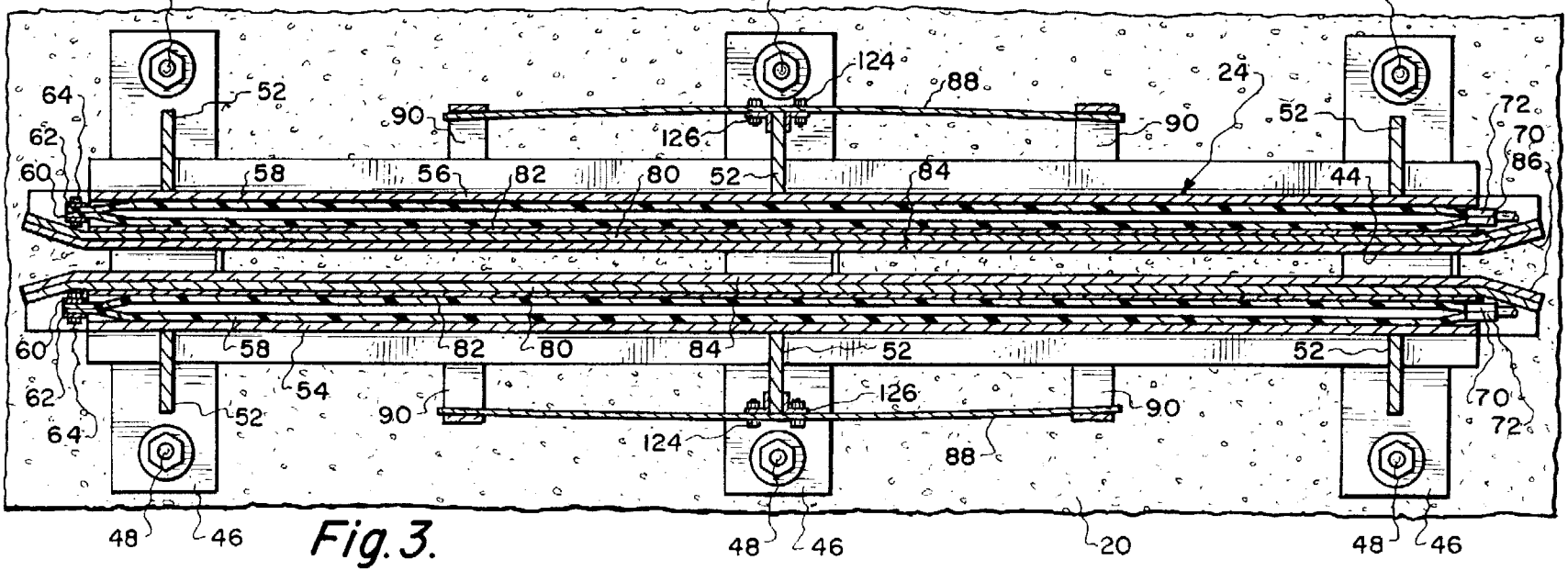
FIG. 3 is a cross-sectional view taken in the direction from the top of the brake apparatus of the present invention taken along line 3—3 of FIG. 2 and also along line 3—3 of FIG. 4.

The metallic cross beam 46 that is located at the left side of FIG. 2 has a stop block 112 mounted to the U-shaped plate 80. The stop block 112 has a plurality of threaded bolts 114 protruding therefrom. These threaded bolts 114 are to engage with a wear plate 116 which is fixedly mounted by threaded bolts 118 to the metallic cross beam 46 that is located at the left side of FIG. 2. Again, the threaded bolts 114 are to be adjusted so that such contact the wear plate 116 at precisely the same time that threaded bolts 106 contact wear plate 108 and stop block 98 contacts wear plate 102. The reason for the threaded bolts 106 and 114 is that the threaded bolts 106 and 114 are to compensate for minor variations in mounting positions of the different metallic cross beams 46 when mounted on the cement base 22. Stop block 98 does not need threaded bolts since stop blocks 104 and 112 are adjusted relative to stop block 98. It is to be noted that the braking force that is encountered by the brake apparatus 24 is to be divided equally between each metallic cross beam 46. This division of force is desirable so that the wear encountered by the metallic cross beams 46 is not concentrated at a particular metallic cross beam 46.

Figure 4:
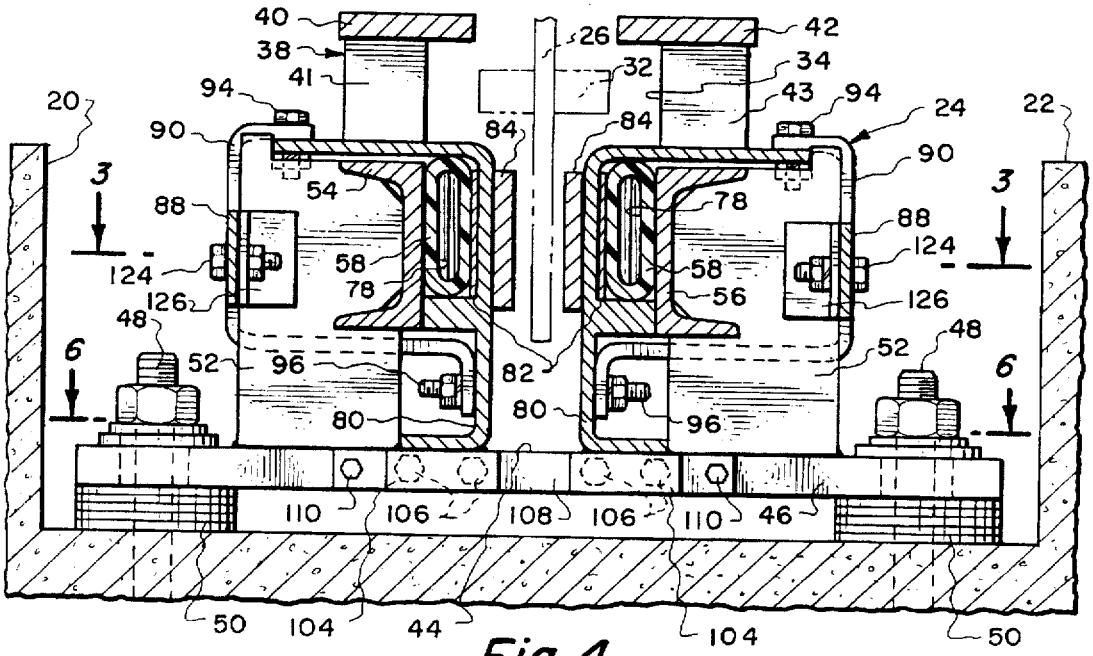
FIG. 4 is a transverse cross-sectional view through the brake apparatus of the present invention taken along line 4—4 of FIG. 2 showing the brake apparatus in the non-braking position.
Figure 5:
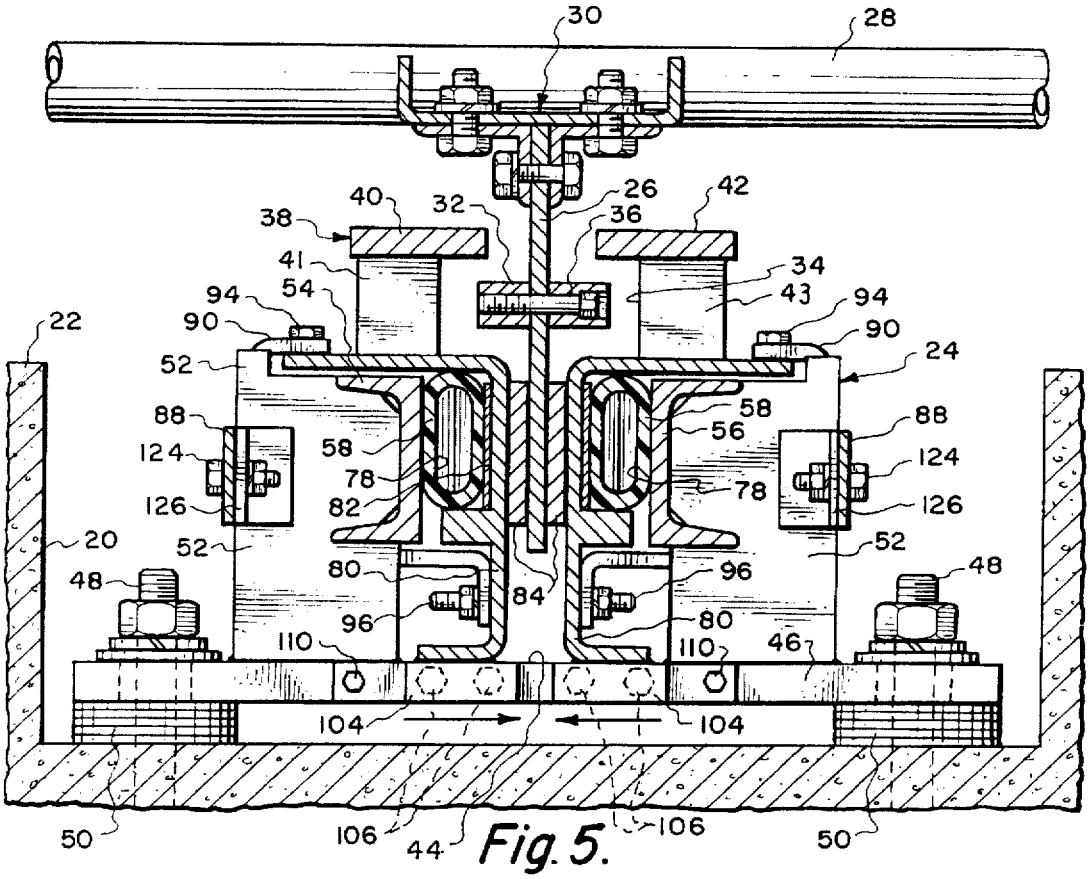
FIG. 5 is a cross-sectional view similar to FIG. 4 but showing the brake apparatus in the braking position.
Figure 6:
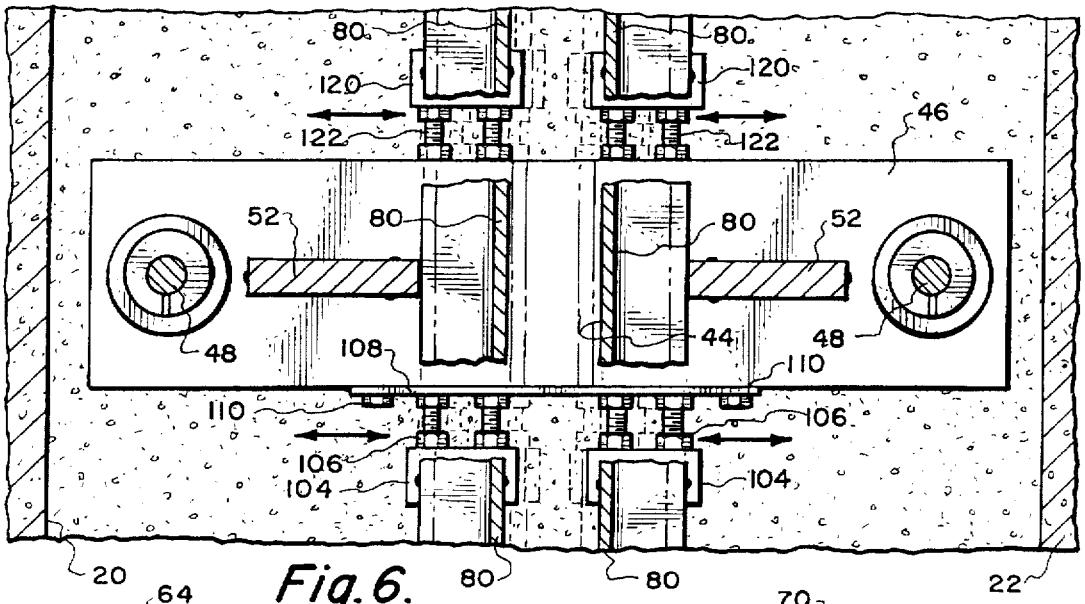
FIG. 6 is a cross-sectional view taken along line 6—6 of FIG. 4 showing in more detail the brake apparatus of the present invention.
Figure 7:
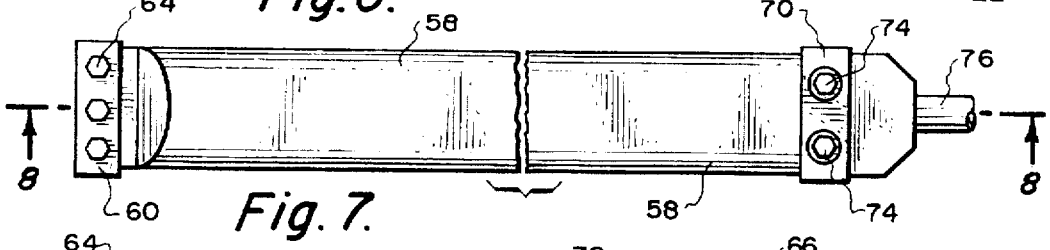
FIG. 7 is an exterior longitudinal view of an inflatable bladder assembly that is utilized in conjunction with the brake apparatus of the present invention.
Figure 8:
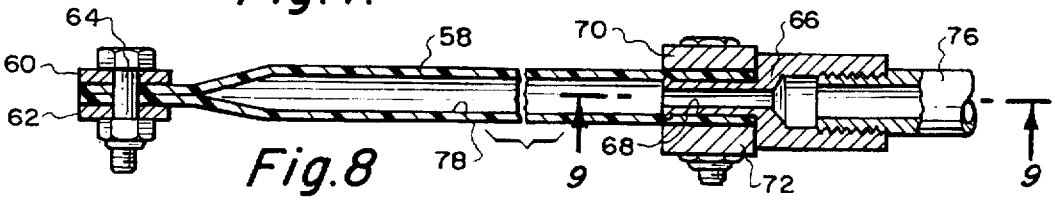
FIG. 8 is a longitudinal cross-sectional view of the inflatable bladder assembly utilized in conjunction with the brake apparatus of the present invention taken along line 8—8 of FIG. 7.
Figure 9:
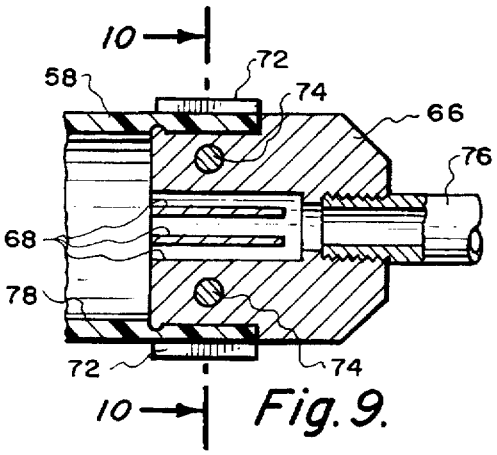
FIG. 9 is a longitudinal cross-sectional view through the fitting that is mounted in conjunction with one end of the inflatable bladder assembly taken along line 9—9 of FIG. 8.
Figure 10:
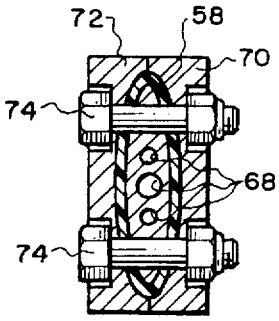
FIG. 10 is a transverse cross-sectional view through the air supply fitting utilized in conjunction with the inflatable bladder assembly taken along line 10—10 of FIG. 9.

After the vehicle has come to a stop, it will be necessary to move the vehicle back to the starting position. At that particular time the guide blade 26 will be moved from left to right in FIG. 2 through the brake apparatus 24. Although the brake apparatus 24 should be in the non-braking position as shown in FIG. 4, there is a possibility that the guide blade 26 will come into momentary contact with one of the brake shoes 84. In that particular time, there will be a tendency for the brake apparatus 24 to be moved toward the right in FIG. 2. It is desirable to prevent this movement and to do so there is mounted a stop block 120 on each U-shaped plate 80. Each stop block 120 has a plurality of threaded bolts 122 extending therefrom which are to come into contact with the metallic cross beam 46 that is located in the middle of the longitudinal length of the brace apparatus 24. In this particular situation, there is no need to be concerned with excessive wear. Therefore wear plates are not required since the brake apparatus 24 is not in the braking position. Threaded bolts 122 can be adjusted to come into contact with their respective metallic cross beam 46 only after a few thousands of an inch in movement of the U-shaped plate 80 and the lineal direction is the reverse of the accelerating lineal direction of the vehicle.

What is claimed is:

1. A brake apparatus mounted in conjunction with a track, a structure movable on said track, said brake apparatus comprising:

a pair of braking units, a first portion of said braking units being fixed to said track, a second portion of said braking units being movable from a non-braking position to a braking position, said braking position locating said second portion of said braking unit to contact said structure to result in slowing of said structure to achieve eventual stopping of said structure, said non-braking position locating said second portion of said braking units spaced from said structure, said braking units being movable toward each other during movement from said non-braking position to said braking position, a plurality of metallic cross beams fixedly mounted to said track, said second portion of said braking units being slidably mounted on said metallic cross beams, each said metallic cross beam including a removable wear plate, said second portion including contact means to push against said wear plates when said brake apparatus is in said braking position and said second portion is in contact with said structure.

2. The brake apparatus as defined in claim 1 wherein: said track being in a straight line.

3. The brake apparatus as defined in claim 1 wherein: each said braking unit being continuously spring biased by a biasing means toward said non-braking position.

4. The brake apparatus as defined in claim 3 wherein: said biasing means comprising a leaf spring assembly.

5. The brake apparatus as defined in claim 1 wherein: each said second portion of said braking unit being movable to said braking position by means of an inflatable bladder assembly.

6. The brake apparatus as defined in claim 1 wherein: said contact means being adjustable thereby dividing the force of said second portion pushing against said wear plates between said metallic cross beams.

*7. A brake apparatus mounted in conjunction with a track, a structure movable in a lineal direction on said track, said brake apparatus comprising:*

*a pair of braking units, each said braking unit having a first portion and a second portion, each said first portion being fixed to said track, each said second portion being movable in the direction transverse to said lineal direction from a non-braking position to a braking position with said second portion of each said braking unit facing each other and being moved toward each other, said braking position locating each said second portion in a location to contact said structure to apply a braking force to result in slowing of said structure along said lineal direction to achieve eventual stopping of said structure, said non-braking position locating each said second portion spaced from said structure; and*

*braking force dividing means mounted on each said second portion, said braking force tending to cause each said second portion to move in said lineal direction, said braking force dividing means to substantially evenly distribute said braking force along each said braking unit to prevent localized concentration of said braking force at a particular location within each said braking unit.*

*8. The brake apparatus as defined in claim 7 wherein: said track being in a straight line.*

*9. The brake apparatus as defined in claim 7 wherein: each said braking unit being continuously spring biased by a biasing means toward said non-braking position.*

*10. The brake apparatus as defined in claim 9 wherein: said biasing means comprising a leaf spring assembly.*

*11. The brake apparatus as defined in claim 7 wherein: each said second portion of said braking unit being movable to said braking position by means of an inflatable bladder assembly.*

*12. A brake apparatus mounted in conjunction with a track, a structure movable in a lineal direction on said track, said brake apparatus comprising:*

*a pair of braking units, each said braking unit having a first portion and a second portion, said first portion of each said braking unit being fixed to said track, said second portion of each said braking unit being movable in a direction transverse to said lineal direction from a non-braking position to a braking position, said braking position locating each said second portion in a location to contact said structure to apply a braking force to result in slowing of said structure along said lineal direction to achieve eventual stopping of said structure, said non-braking position locating each said second portion of said braking unit spaced from each other, said braking units being movable toward each other during movement from said non-braking position to said braking position;*

*each said second portion including contact means to push against said track to prevent movement of each said second portion in said lineal direction when said brake apparatus is in said braking position and said second portion is in contact with said structure;*

*each said braking unit being continuously spring biased by a biasing means toward said non-braking position; and*

*said biasing means comprising a leaf spring assembly.*

*13. A brake apparatus mounted in conjunction with a track, a structure movable in a lineal direction on said track, said brake apparatus comprising:*

*a pair of braking units, each said braking unit having a first portion and a second portion, said first portion of each said braking unit being fixed to said track, said second portion of each said braking unit being movable in a direction transverse to said lineal direction from a non-braking position to a braking position, said braking position locating each said second portion in a location to contact said structure to apply a braking force to result in slowing of said structure along said lineal direction to achieve eventual stopping of said structure, said non-braking position locating each said second portion of said braking unit spaced from each other, said braking units being movable toward each other during movement from said non-braking position to said braking position;*

*each said second portion including contact means to push against said track to prevent movement of each said second portion in said lineal direction when said brake apparatus is in said braking position and said second portion is in contact with said structure; and*

*each said second portion of said braking unit being movable to said braking position by means of an inflatable bladder assembly.*

*14. A brake apparatus mounted in conjunction with a track, a structure movable in a lineal direction on said track, said brake apparatus comprising:*

*a pair of braking units, each said braking unit having a first portion and a second portion, said first portion of each said braking unit being fixed to said track, said second portion of each said braking unit being movable in a direction transverse to said lineal direction from a non-braking position to a braking position, said braking position locating each said second portion in a location to contact said structure to apply a braking force to result in slowing of said structure along said lineal direction to achieve eventual stopping of said structure, said non-braking position locating each said second portion of said braking unit spaced from each other, said braking units being movable toward each other during movement from said non-braking position to said braking position;*

*each said second portion including contact means to push against said track to prevent movement of each said second portion in said lineal direction when said brake apparatus is in said braking position and said second portion is in contact with said structure; and*

*said contact means being adjustable thereby dividing the force of each said second portion pushing against said track.*

* * * * *